(12) United States Patent
Cheng et al.

(10) Patent No.: US 7,739,534 B2
(45) Date of Patent: Jun. 15, 2010

(54) PORTABLE ELECTRONIC APPARATUS WITH A POWER SAVING FUNCTION AND METHOD FOR IMPLEMENTING THE POWER SAVING FUNCTION

(75) Inventors: Hua-Dong Cheng, Guangdong (CN); Hai-Sen Liang, Guangdong (CN); Duo Liu, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 731 days.

(21) Appl. No.: 11/619,616

(22) Filed: Jan. 4, 2007

(65) Prior Publication Data

US 2007/0250724 A1    Oct. 25, 2007

(30) Foreign Application Priority Data

Apr. 19, 2006    (CN) .................. 2006 1 0060384

(51) Int. Cl.
G06F 1/32    (2006.01)
(52) U.S. Cl. .................. 713/324; 713/300; 713/323
(58) Field of Classification Search .............. 713/300, 713/310, 322, 323, 324
See application file for complete search history.

(56) References Cited

U.S. PATENT DOCUMENTS

| | | | |
|---|---|---|---|
| 5,715,278 A | | 2/1998 | Croft et al. |
| 5,752,046 A | * | 5/1998 | Oprescu et al. ............. 713/300 |
| 6,442,699 B1 | * | 8/2002 | Nakajima ................... 713/320 |
| 7,020,786 B2 | * | 3/2006 | Vyssotski et al. ........... 713/300 |
| 2003/0070105 A1 | | 4/2003 | Launiainen |
| 2003/0226047 A1 | | 12/2003 | Park |
| 2005/0091550 A1 | * | 4/2005 | Tani ........................... 713/320 |
| 2006/0179329 A1 | * | 8/2006 | Terechko et al. ............ 713/300 |

* cited by examiner

*Primary Examiner*—Dennis M Butler
(74) *Attorney, Agent, or Firm*—Winston Hsu

(57) ABSTRACT

A method for implementing a power saving function of the portable electronic apparatus is provided. The method includes the step of: receiving an operation command transmitted from an input device; obtaining a new work mode which corresponds to the operation command from a work mode table that defines a plurality of work modes of the portable electronic apparatus and a plurality of operation commands corresponding to the work modes, if a current work mode of the portable electronic apparatus does not correspond to the operation command; determining component work state changes of components of the portable electronic apparatus from the current work mode to the new work mode; signaling a power control unit to change component work states of the components according to the determined component work state changes.

11 Claims, 3 Drawing Sheets

PORTABLE ELECTRONIC APPARATUS WITH A POWER SAVING FUNCTION AND METHOD FOR IMPLEMENTING THE POWER SAVING FUNCTION

BACKGROUND OF THE INVENTION

1. Field of the Invention

The present invention relates generally to a portable electronic apparatus with a power saving function and a method for implementing the power saving function.

2. Description of Related Art

With the development of electronic technology, various battery-powered portable electronic apparatuses such as handsets, PDAs (Personal digital assistants), MP3 players, and e-books, has brought convenience to people. A limited battery is employed by the portable electronic apparatus, and the limited battery runs out of energy quickly and needs to be recharged or replaced frequently to replenish power. Otherwise, the portable electronic apparatuses may not function.

Many solutions have been introduced to reduce the power consumption of the portable electronic apparatuses, thus to prolong service times per charge of the batteries of the portable electronic apparatuses. Those solutions generally set a "standby state" or a "sleep state" for a portable electronic apparatus. In the "standby state" or the "sleep state" the power supply to the portable electronic apparatus is reduced, thus reducing power consumption of the portable electronic apparatus.

However, in actual applications, during implementing some operation command, only a part of components of the apparatus are needed, but other components that are not needed are still in an enabled state and consume power.

Therefore, What is still needed is a portable electronic apparatus and method which can further save power.

SUMMARY OF THE INVENTION

A portable electronic apparatus with a power saving function is provided. A preferred embodiment of the apparatus includes a power unit, a data storage, an input device, a power control unit, and a CPU. The power unit is for supplying power directly to the CPU, the input device, the power control unit, and the data storage. The data storage is for storing a work mode table that defines a plurality of work modes of the apparatus and a plurality of operation commands corresponding to the work modes. The input device is provided for inputting an operation command. The power control unit for controlling power supply of power consuming components excepting the CPU, the input device, the power control unit, and the data storage. The CPU (central processing unit) includes an operation command receiving module, a work mode detection module, a work state detection module, and a work state updating module. The operation command receiving module is for receiving the operation command transmitted from the input device. The work mode detection module is for obtaining a new work mode which corresponds to the operation command from the work mode table. The work state detection module is for determining component work state changes of the power consuming components from a current work mode to the new work mode. The work state updating module is for signaling the power control unit to change the component work states of the power consuming components according to the determination of the work state detection module.

A method for implementing a power saving function of the portable electronic apparatus is provided. The method includes the step of: receiving an operation command transmitted from an input device; obtaining a new work mode which corresponds to the operation command from a work mode table that defines a plurality of work modes of the portable electronic apparatus and a plurality of operation commands corresponding to the work modes, if a current work mode of the portable electronic apparatus does not correspond to the operation command; determining component work state changes of components of the portable electronic apparatus from the current work mode to the new work mode; signaling a power control unit to change component work states of the components according to the determined component work state changes.

Other advantages and novel features will be drawn from the following detailed description of the preferred embodiment with reference to the attached drawings, in which:

DETAILED DESCRIPTION OF THE INVENTION

Figure 1:
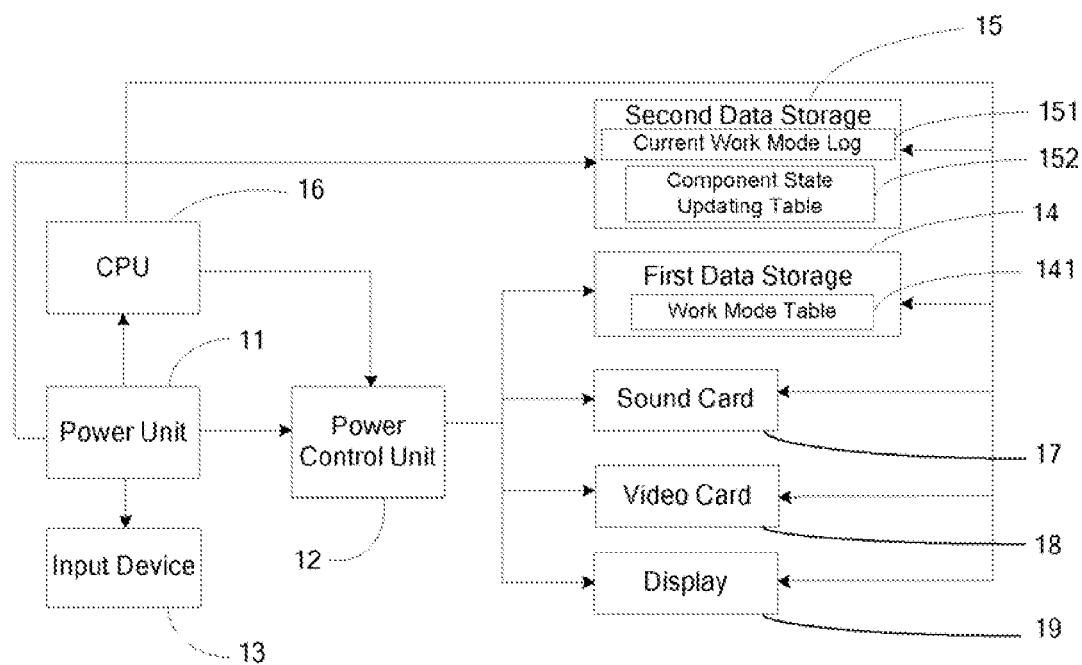
FIG. 1 is an exemplary hardware infrastructure diagram of a portable electronic apparatus with a power saving function in accordance with a preferred embodiment of the present invention.

FIG. 1 is an exemplary hardware infrastructure diagram of a portable electronic apparatus with a power saving function (hereinafter "the apparatus") in accordance with a preferred embodiment of the present invention. The apparatus includes a power unit 11, a power control unit 12, an input device 13, a first data storage 14, a second data storage 15, a CPU (central processing unit) 16, and other components such as a display 17, a sound card 18, and a video card 19.

The power unit 11 is for supplying power to power consuming components of the apparatus. In the preferred embodiment, the power unit 11 supplies power directly to the power control unit 12, the CPU 16, the input device 13, and the second data storage 15. Mandatory components consisting the power control unit 12, the CPU 16, the input device 13, and the second data storage 15 remains powered and are kept in an enabled state unless the apparatus is powered off. The power unit 11 supplies and controls power to command dependent components consisting of components other than the mandatory components such as the first data storages 14 via the power control unit 12 according to signals produced and transmitted by the CPU 16. The input device 13 is provided for users to input operation commands.

The first data storage 14 is a nonvolatile data storage for storing a work mode table 141 that defines a plurality of operation commands and work mode of the operation commands. In the preferred embodiment, one or more operation commands may corresponds to a same work mode. When the operation command is received, the CPU 16 searches for the work mode corresponding the operation command in the work mode table 141, and then changes a work mode of the apparatus to the work mode accordingly.

In each of the work modes, only the components of the command dependent components of the apparatus needed are set in an enabled state and the components not needed are set in a disabled state. That is, each of the work modes defines the components needed for use. For example, a read work mode is defined for the apparatus, in the read work mode, the first data storages 14 and the display 20 are necessary and therefore are set in the enabled state, while the other components are set in the disabled state. In the preferred embodiment, a standby mode is also defined such that all of the components other than the mandatory components are set in the disabled state. The apparatus automatically enters the standby mode if the operation command is not received in a predetermined time and awakens from the standby mode upon receiving an active command from the input device 13.

The second data storage 15 is a volatile storage such as a memory, and is used for temporarily storing data read from the first data storage 11. When the apparatus is powered on, the work mode table 141 is copied from the first data storage 14 into the second data storage 15. The second data storage 15 further stores a current work mode log 151 and a work state updating table 152.

When initially powered on, the apparatus enters a default/predetermined work mode that is recorded in the work mode table 141, and then the current work mode log 151 is generated and stored in the second data storage 15. The work mode log 151 is used for storing a current work mode of the apparatus. As previously mentioned, the default/predetermined work mode would be the current work mode and therefore recorded in the current work mode log 151.

When the CPU 16 detects that the current work mode is not the work mode listed in the work mode table corresponding to the operation command received, the apparatus is changed to a new work mode according to operation command. The work state updating table 152 is generated in the second data storage 15 during a first work mode change after the apparatus is powered on. The work state updating table 152 is used for recording needed component work state changes of components during each work mode changes of the apparatus.

Figure 2:
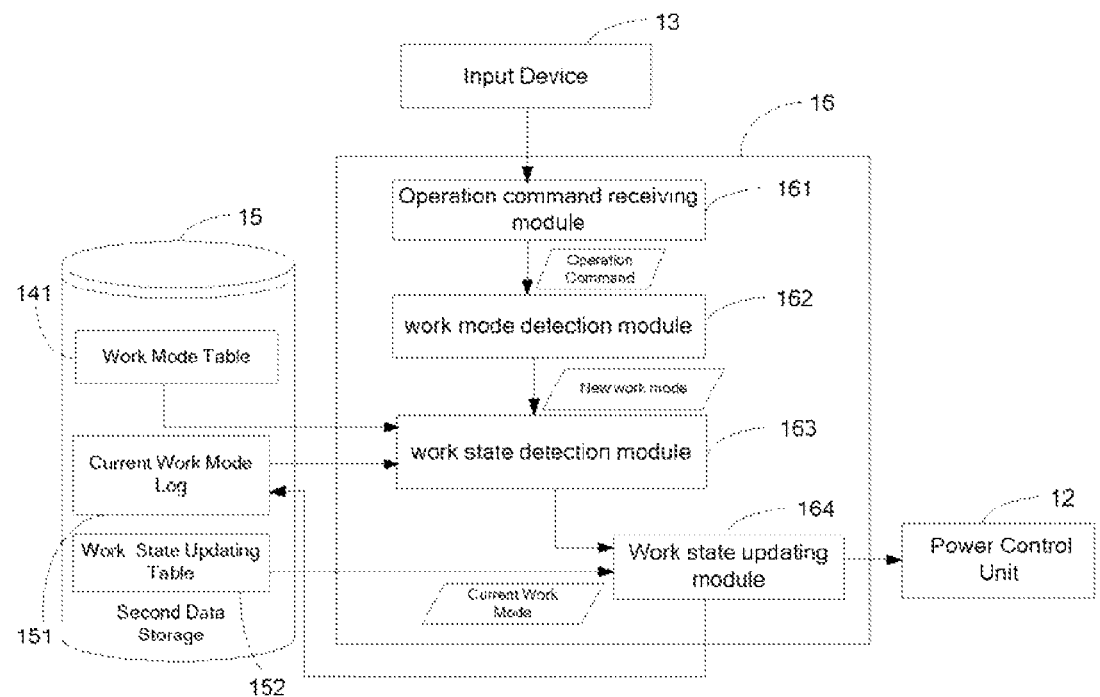
FIG. 2 is a function module diagram of a CPU of FIG. 1.

FIG. 2 is a function module diagram of the CPU 16. The CPU 16 includes an operation command receiving module 161, a work mode detection module 162, a work state detection module 163, a work state updating module 164, and a standby state entering module 165.

The operation command receiving module 161 is for receiving the operation command transmitted from the input device 13. The work mode detection module 162 is for searching the operation command in the work mode table 141 to determine whether the command operation mode corresponds to the current work mode of the apparatus recorded in the current work mode log 151, and obtain a new work mode which corresponds to the command operation command if the current work mode recorded in the current work mode log 151 does not correspond to the operation command. The work state detection module 163 is for determining the component work state changes of the components from the current work mode to the new work mode, and updating the work state updating table 152 to record the component work state changes.

The work state updating module 164 is for signaling the power control unit 13 to change the component work states of the components according to the component work state changes recorded in the work state updating table 152. For example, if a component work state change of the first data storage 14 recorded in the work state updating table 152 is "on-to-off", the work state updating module 164 signals the power control unit 13 to cut off the power supply of the first data storage 14, thus changing a state the first data storage 14 to the disabled state. The component work states of the components changes according to the work state updating table 152 and are performed by the work state updating module 164, afterwards the apparatus enters the new work mode, the new work mode is now the current work mode and recorded in the current work mode log 151.

After entering the new work mode, the standby mode entering module 165 starts to clock an elapsed time during which neither of the operation commands is received, and changes the work mode the apparatus enter the standby mode when the elapsed time reaches a predetermined time. The apparatus is awakens from the standby mode upon receiving an active command from the input device 13.

Figure 3:
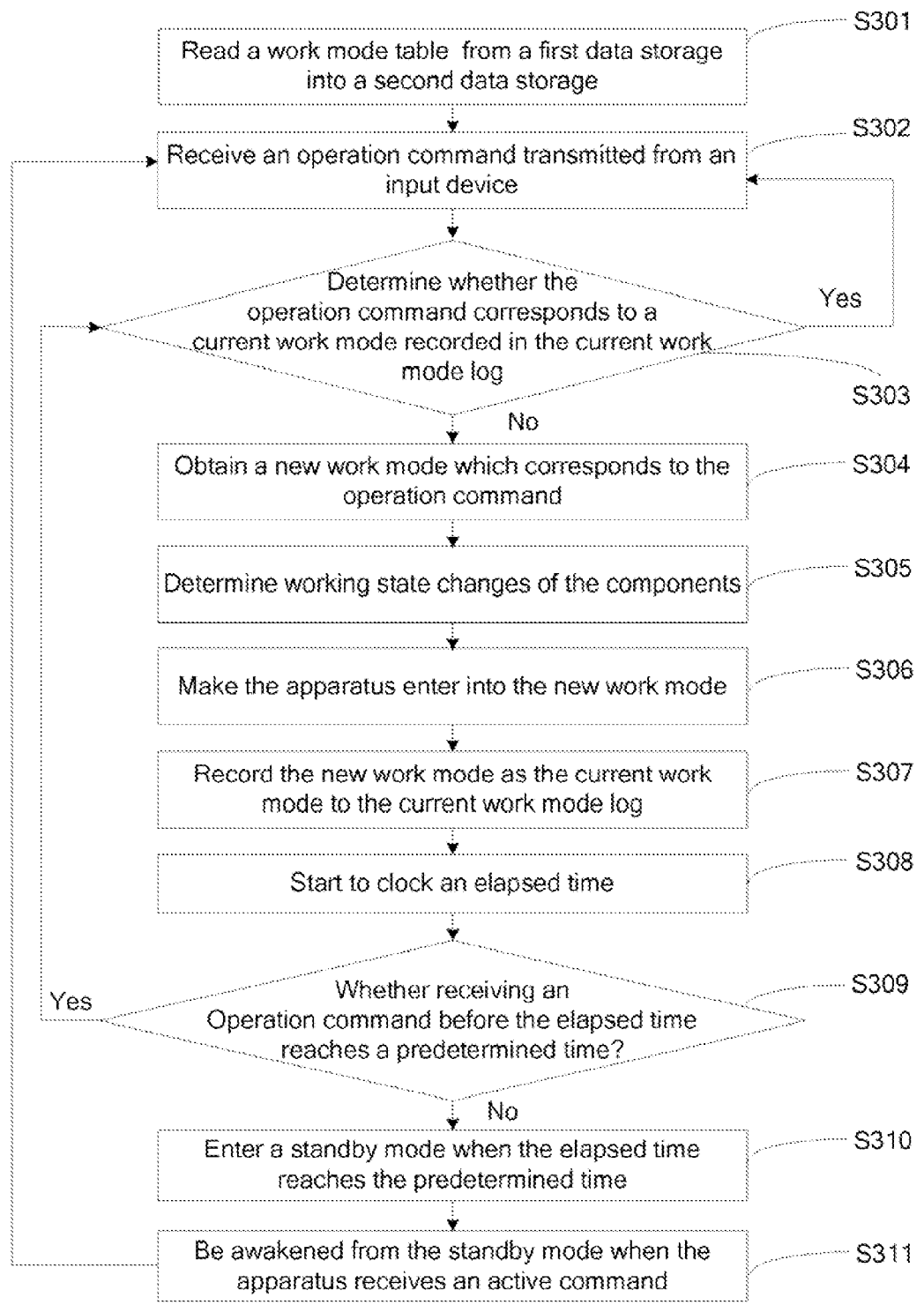
FIG. 3 is a flow chart for implementing a power saving function of the portable electronic apparatus of FIG. 1.

FIG. 3 is a flow chart for implementing the power saving function of the portable electronic apparatus of FIG. 1.

In step S301, the work mode table 141 is copied from the first data storage 14 into the second data storage 15 after the apparatus is powered on.

In step S302, the operation command receiving module 161 receives the operation command transmitted from the input device 13.

In step S303, the work mode detection module 162 detects whether the current work mode of the current work mode log 151 corresponds to the work mode listed in the work mode table 141 according to the operation command. The procedure returns to step S302 described above if the current work mode recorded in the current work mode log 151 corresponds to the operation command.

In step S304, the work mode detection module 162 obtain a new work mode by searching for the operation command in the work mode table 141 if the current work mode recorded in the current work mode log 151 does not correspond to the operation command.

In step S305, the work state detection module 163 determines component work state changes of the components needed from the current work mode to the new work mode, and updates the work state updating table 152 with the component work state changes.

In step S306, the work state updating module 164 signals the power control unit 13 to change the component work states of the components according to the component work state changes recorded in the work state updating table 152.

In step S307, the work state updating module 164 updates the current work mode log 151 to record the new work mode as the current work mode.

In step S308, the standby mode entering module 165 starts to clock an elapsed time during neither of the operation signals is received.

In step S309, the standby mode entering module 165 detects whether the elapsed time reaches a predetermined time, and keep clocking the elapsed time if the elapsed time does not reach the predetermined time. Otherwise, the procedure goes on to step S310 described below.

In step S310, the standby mode entering module 165 makes the apparatus enter the standby mode.

In step S311, the standby mode entering module 165 make the apparatus is awakened from the standby mode according to the active command received from the input device 13. Then the procedure returns to the step S302 and repeats until the apparatus is powered off.

Although the present invention has been specifically described on the basis of a preferred embodiment, the invention is not to be construed as being limited thereto. Various changes or modifications may be made to the embodiment without departing from the scope and spirit of the invention.

What is claimed is:

1. A portable electronic apparatus with a power saving function, comprising:
   a data storage for storing a work mode table that defines a plurality of operation commands and work mode of the operation commands;

an input device provided for inputting an operation command;

a CPU (central processing unit);

a power control unit for controlling power supply of power consuming components excepting the CPU, the input device, the power control unit, and the data storage; and a power unit for supplying power directly to the CPU, the input device, the power control unit, and the data storage;

wherein, the CPU comprises:

an operation command receiving module for receiving the operation command transmitted from the input device;

a work mode detection module for obtaining a new work mode which corresponds to the operation command from the work mode table;

a work state detection module for determining component work state changes of the power consuming components from a current work mode to the new work mode; and a work state updating module for signaling the power control unit to change the component work states of the power consuming components according to the determination of the work state detection module.

2. The apparatus as described in claim 1, wherein the data storage is for further storing a current work mode log for recording the current work mode of the apparatus.

3. The apparatus as described in claim 1, wherein the data storage is for further storing a work state updating table for recording component work state changes of the power consuming components from the current work mode to the new work mode.

4. The apparatus as described in claim 1, wherein a standby mode is predetermined for the apparatus, under which only the data storage, the input device, the power control unit, and the CPU are in an enabled state.

5. The apparatus as described in claim 4, wherein the CPU further comprises a standby mode entering module for making the apparatus enter the standby mode when an elapsed time during which no operation commands is inputted by the input device reaches a predetermined time.

6. The apparatus as described in claim 5, wherein the apparatus is awakened from the standby mode when the standby mode entering module receives an active command.

7. A method for implementing a power saving function of the portable electronic apparatus, comprising the steps of:

providing a power control unit for controlling power supply of power consuming components excepting a CPU (central processing unit), an input device, a power control unit, and a data storage of the portable electronic apparatus;

providing a power unit for supplying power directly to the CPU, the input device, the power control unit, and the data storage;

receiving an operation command transmitted from the input device;

obtaining a new work mode which corresponds to the operation command from a work mode table if a current work mode of the portable electronic apparatus does not correspond to the operation command, work mode table defines a plurality of operation commands and work mode of the operation commands;

determining component work state changes of components of the portable electronic apparatus from the current work mode to the new work mode;

signaling the power control unit to change component work states of the components according to the determined component work state changes.

8. The method as described in claim 7, further comprising the step of recording the component work state changes in a work state updating table.

9. The method as described in claim 7, further comprising the step of recording the new work mode as a current work mode in a current work mode log.

10. The method as described in claim 7, further comprising the step of starting to clock an elapsed time during which no operation commands is received from the input device, and making the portable electronic apparatus enter a standby mode when the elapsed time reaches a predetermined time.

11. The method as described in claim 10, further comprising the step of awakening the portable electronic apparatus from the standby mode according to an active command received from the input device.

* * * * *